US011109205B2

(12) United States Patent
Zhao

(10) Patent No.: US 11,109,205 B2
(45) Date of Patent: Aug. 31, 2021

(54) METHOD AND APPARATUS FOR SWITCHING IN-VEHICLE SERVICE BY USING EXTERNAL SIM CARD

(71) Applicant: HUAWEI TECHNOLOGIES CO., LTD., Shenzhen (CN)

(72) Inventor: Wenwei Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/347,812

(22) PCT Filed: Nov. 7, 2016

(86) PCT No.: PCT/CN2016/104948
§ 371 (c)(1),
(2) Date: May 7, 2019

(87) PCT Pub. No.: WO2018/082105
PCT Pub. Date: May 11, 2018

(65) Prior Publication Data
US 2019/0297476 A1      Sep. 26, 2019

(51) Int. Cl.
*H04B 1/38*      (2015.01)
*H04W 4/60*      (2018.01)
(Continued)

(52) U.S. Cl.
CPC ............. *H04W 4/60* (2018.02); *H04W 48/18* (2013.01); *H04W 8/18* (2013.01); *H04W 88/02* (2013.01)

(58) Field of Classification Search
CPC ....... H04W 4/60; H04W 48/18; H04W 48/20; H04W 8/18; H04W 88/02
(Continued)

(56) References Cited

U.S. PATENT DOCUMENTS 6,603,982 B1 * 8/2003 Muller ................. H04W 8/205
                                                        455/558
10,244,382 B2 * 3/2019 Chong ................. H04N 7/181
(Continued)

FOREIGN PATENT DOCUMENTS

CN       2647670 Y     10/2004
CN     202068417 U     12/2011
(Continued)

OTHER PUBLICATIONS

Qiongxia Chen,"Development of Universal Automobile Multimedia Application Integration System",dated Mar. 15, 2016,total 63 pages.
(Continued)

*Primary Examiner* — Kathy W Wang-Hurst
*Assistant Examiner* — Max Mathew
(74) *Attorney, Agent, or Firm* — Maier & Maier, PLLC

(57) ABSTRACT

Embodiments of the present invention disclose a method and an apparatus for switching an in-vehicle service by using an external SIM card. The apparatus is a TBox provided with an external SIM card slot, and when the TBox detects that a valid external SIM card is inserted into the external SIM card slot, the TBox switches to a network to which the external SIM card belongs. By disposing the external SIM card slot, user demands for diversified in-vehicle services can be met.

9 Claims, 5 Drawing Sheets

(51) Int. Cl.
*H04W 48/18* (2009.01)
*H04W 88/02* (2009.01)
*H04W 8/18* (2009.01)

(58) Field of Classification Search
USPC .......................................................... 455/558
See application file for complete search history.

(56) References Cited

U.S. PATENT DOCUMENTS

| | | | |
|---|---|---|---|
| 2004/0152445 A1 | 8/2004 | Muller | |
| 2004/0225800 A1 | 11/2004 | Lin | |
| 2012/0275445 A1* | 11/2012 | Karlsson | H04B 1/3816 370/338 |
| 2012/0289197 A1* | 11/2012 | Holtmanns | H04M 1/675 455/411 |
| 2012/0315875 A1* | 12/2012 | Breuer | H04L 63/108 455/411 |
| 2013/0023231 A1* | 1/2013 | Zhu | H04M 1/7246 455/406 |
| 2013/0237197 A1* | 9/2013 | Ruvalcaba | H04W 8/183 455/418 |
| 2015/0282060 A1* | 10/2015 | Huang-Fu | H04W 8/205 455/435.2 |
| 2015/0358798 A1* | 12/2015 | Okawa | H04W 4/40 455/404.2 |
| 2016/0107610 A1* | 4/2016 | Lemoult | H04K 3/68 340/426.11 |
| 2017/0041737 A1* | 2/2017 | Fischer | G01P 1/14 |
| 2017/0195321 A1* | 7/2017 | He | H04L 61/6054 |
| 2017/0332273 A1* | 11/2017 | Link, II | H04W 36/0027 |
| 2018/0020101 A1* | 1/2018 | Chan | H04W 4/24 |
| 2018/0046832 A1* | 2/2018 | Lee | G06F 3/0632 |
| 2018/0220293 A1* | 8/2018 | Huang | H04W 8/22 |
| 2020/0084611 A1* | 3/2020 | Huang | H04W 48/16 |
| 2020/0382942 A1* | 12/2020 | Choi | H04L 65/1096 |

FOREIGN PATENT DOCUMENTS

| | | |
|---|---|---|
| CN | 104468713 A | 3/2015 |
| CN | 104640238 A | 5/2015 |
| CN | 204340881 U | 5/2015 |
| CN | 105072403 A | 11/2015 |
| CN | 205584186 U | 9/2016 |
| CN | 205665517 U | 10/2016 |
| CN | 106068673 A | 11/2016 |
| EP | 0586081 A1 | 3/1994 |
| EP | 1058467 A2 | 12/2000 |
| EP | 2518977 A1 | 10/2012 |
| GB | 2345177 A | 6/2000 |
| WO | 2015177602 A1 | 11/2015 |

OTHER PUBLICATIONS

Roberto Viti et al.,"User initiated fast identity switch between LTE UEs",2015 AEIT International Annual Conference (AEIT),dated Oct. 14-16, 2015,total 6 pages.

K. Ashwin Kumar et al. "E-VIVEGAM Sim Card based Vehicle Speed Control System (SIMCON)." 2008 I ET International Conference on Wireless, Mobile and Multimedia Networks. Mar. 12, 2018. 7 pages.

Kun Wei. "Research on GPRS Transmission for Vehicle CAN Network." Excellent Master's Dissertation of China, Full-Text Database Information Science and Technology Series (Monthly Magazine). Sep. 15, 2008. 2 pages. English Abstract provided.

* cited by examiner

METHOD AND APPARATUS FOR SWITCHING IN-VEHICLE SERVICE BY USING EXTERNAL SIM CARD

CROSS-REFERENCE TO RELATED APPLICATIONS

This application is a National Stage of International Application No. PCT/CN2016/104948, filed on Nov. 7, 2016, which is hereby incorporated by reference in its entirety.

TECHNICAL FIELD

The present invention relates to the field of vehicle communications, and specifically, to a method and an apparatus for switching an in-vehicle service by using an external SIM card.

BACKGROUND

With popularity of internet of vehicles technologies, an increasing quantity of vehicles are equipped with in-vehicle communications apparatuses, so as to implement interconnection, interworking, and information sharing between people and vehicles and between vehicles. Usually, a SIM card (subscriber identity module) is disposed inside the in-vehicle communications apparatus to implement communication between an in-vehicle infotainment system and a network server. Many internet of vehicles products are available on the market, and well-known products are, for example. OnStar of General Motors Corporation and inKaNet of SAIC Motor Corporation. These products usually provide functions of vehicle condition inspection, emergency rescue, security assurance, speakerphone, and so on.

At present, in-vehicle services are customized for most vehicles before delivery from a factory. All SIM cards pre-installed in the in-vehicle communications apparatuses are welded and cannot be replaced, and a user can only select a permanent operator. Therefore, in-vehicle services are available in a relatively small quantity of varieties and updating of the in-vehicle services is slow. As a result, conventional in-vehicle services are stagnant, and demands of users for individualized in-vehicle services cannot be met, so that users are not so willing to use paid in-vehicle services.

With advancement of mobile internet and communications technologies, users are having extremely strong demands for diversified in-vehicle services. However, the permanent operator and the stagnant in-vehicle services are limiting user choices. For example, when an operator corresponding to a pre-installed SIM card provides poor signal coverage in an area, vehicle positioning and navigation services may be affected, bringing inconvenience to a user and even affecting driving safety.

SUMMARY

In view of this, embodiments of the present invention provide a method and an apparatus for switching an in-vehicle service by using an external SIM card, to meet laser demands for diversified in-vehicle services.

According to a first aspect, an embodiment of the present invention provides an apparatus for switching an in-vehicle service by using an external SIM card. The apparatus is an in-vehicle communications apparatus TBox provided with an external SIM card slot, and when the TBox detects that a valid external SIM card is inserted into the external SIM card slot, the TBox switches to a network to which the external SIM card belongs.

With reference to the first aspect, in a first implementation of the first aspect, the external SIM card slot supports card presence signal detection. The external SIM card slot supports card presence signal detection, to determine whether a new SIM card is inserted. The TBox determines whether the SIM card is valid by interacting with an interactive serial port of the SIM card based on a standard protocol (the ISO7816 protocol). The external SIM card is hot swappable.

With reference to the first aspect, in a second implementation of the first aspect, that the TBox switches to the network to which the external SIM card belongs further includes: changing, by the TBox, an in-vehicle service parameter, logging in to a server corresponding to the external SIM card, and obtaining content of an in-vehicle service. Optionally, in a process in which the TBox performs primary SIM card switching, the TBox may give a user a message of prompting primary SIM card switching, including a message that primary SIM card switching is about to be performed and a message that primary SIM card switching is successful. The message may be presented in a form of a text, a picture, audio, a video, or the like.

With reference to the second implementation of the first aspect, in a third implementation of the first aspect, the changing an in-vehicle service parameter includes changing at least one of the following parameters: a server address, a port number, an emergency telephone number, a customer service number, and an interactive protocol type.

With reference to the second implementation of the first aspect, in a fourth implementation of the first aspect, the content of the in-vehicle service is mapped to an in-vehicle infotainment system in a form of an STK (SIM tool kit) menu. In a process in which the TBox performs primary SIM card switching, the in-vehicle infotainment system changes a user interface to an STK menu corresponding to a new primary SIM card, so as to display an in-vehicle service provided by the new primary SIM card for the user to select.

With reference to the first aspect, in a fifth implementation of the first aspect, the external IM card slot supports insertion of a soft SIM card or a virtual SIM card. Optionally, the external SIM card slot supports dual card dual standby, and allows the user to switch between operators and tariff packages of two SIM cards, so as to obtain broader signal coverage.

With reference to the first aspect, in a sixth implementation of the first aspect, there are a plurality of external SIM card slots.

With reference to the sixth implementation of the first aspect, in a seventh implementation of the first aspect, when the TBox detects that a plurality of valid external SIM cards are inserted into the plurality of external SIM card slots, the TBox switches to a network to which an external SIM card belongs based on a user selection or a preset priority order.

By using the foregoing apparatus, the TBox can switch to the server corresponding to the external SIM card, making it flexible for the user to select in-vehicle services.

According to a second aspect, an embodiment of the present invention provides a method for switching an in-vehicle service by using an external SIM card, including: detecting whether a valid SIM card is inserted into an external SIM card slot of a TBox, and when the TBox detects that a valid external SIM card is inserted into the external SIM card slot, switching, by the TBox, to a network to which the external SIM card belongs.

According to a third aspect, an embodiment of the present invention provides an apparatus, including one or more processors, a memory, and one or more programs, where the one or more programs are stored in the memory and configured for execution by one or more processors, and the one or more programs include an instruction, where the instruction is used to detect whether a valid SIM card is inserted into an external SIM card slot of a TBox, and when the TBox detects that a valid external SIM card is inserted into the external SIM card slot, the TBox switches to a network to which the external SIM card belongs.

According to a fourth aspect, an embodiment of the present invention provides an apparatus for switching an in-vehicle service by using an external SIM card. The apparatus includes a detection unit, a switching unit, and a network connection unit, where the detection unit is configured to detect whether a valid SIM card is inserted into an external SIM card slot of a TBox; the switching unit is configured to: when the detection unit detects that a valid SIM card is inserted into the external SIM card slot of the TBox, switch to a network to which the external SIM card belongs; and the network connection unit is configured to connect to the corresponding network based on a switching result of the switching unit.

According to a fifth aspect, an embodiment of the present invention provides a computer storage medium storing one or more programs, where the one or more programs include an instruction, and the instruction is used to detect whether a valid SIM card is inserted into an external SIM card slot of a TBox, and when the TBox detects that a valid external SIM card is inserted into the external SIM card slot, the TBox switches to a network to which the external SIM card belongs.

According to the foregoing solutions, the TBox can switch between an internal SIM card and an external SIM card and log in to a corresponding server, meeting user demands for diversified in-vehicle services.

DESCRIPTION OF EMBODIMENTS

The technical solutions of the embodiments of the present invention are clearly described in the following with reference to the accompanying drawings. Apparently, the described embodiments are merely some but not all of the embodiments of the present invention. Based on the embodiments of the present invention, a person of ordinary skill in the art may obtain other implementations without creative efforts. These implementations shall all fall within the protection scope of the present invention.

As a level of informatization becomes higher, demands for interconnection between vehicles and between vehicles and people are increasingly urgent, and an increasing quantity of vehicles are connected to an interact of vehicles (internet of vehicles, IOV) system. The internet of vehicles system mainly includes four parts: an in-vehicle infotainment system (in-vehicle infotainment, WI, in-vehicle infotainment system), a TBox (telematics box, telematics box), a mobile phone APP (application, application and a server. The in-vehicle infotainment system is mainly used for audio and video entertainment and display of vehicle information, and provides functions such as multimedia; web pages, and navigation. The TBox is mainly configured to communicate with the server and the mobile phone APP to support information exchange between the in-vehicle infotainment system and the internet. The mobile phone APP can display and control vehicle information. It should be noted that the mobile phone APP herein is only an example, and may be alternatively other user devices providing a vehicle control function, including but not limited to a tablet computer, a smart vehicle key, and the like. The server is mainly a TSP (telematics service provider, telematics service provider) server, and is configured to provide multimedia information, navigation, and other in-vehicle services.

Figure 1A:
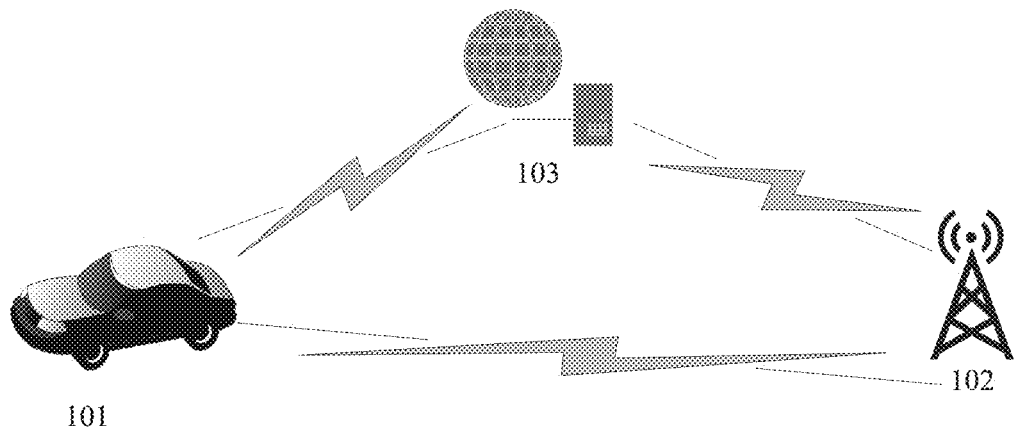
FIG. 1A is a schematic diagram of an internet of vehicles scenario according to an embodiment of the present invention.

In an internet of vehicles scenario shown in FIG. 1A, a vehicle 101 may communicate with a TSP server 103 by using a network device (for example, a base station 102). Specifically, the vehicle 101 may obtain multimedia information, navigation, and other in-vehicle services from the TSP server 103.

Figure 1B:
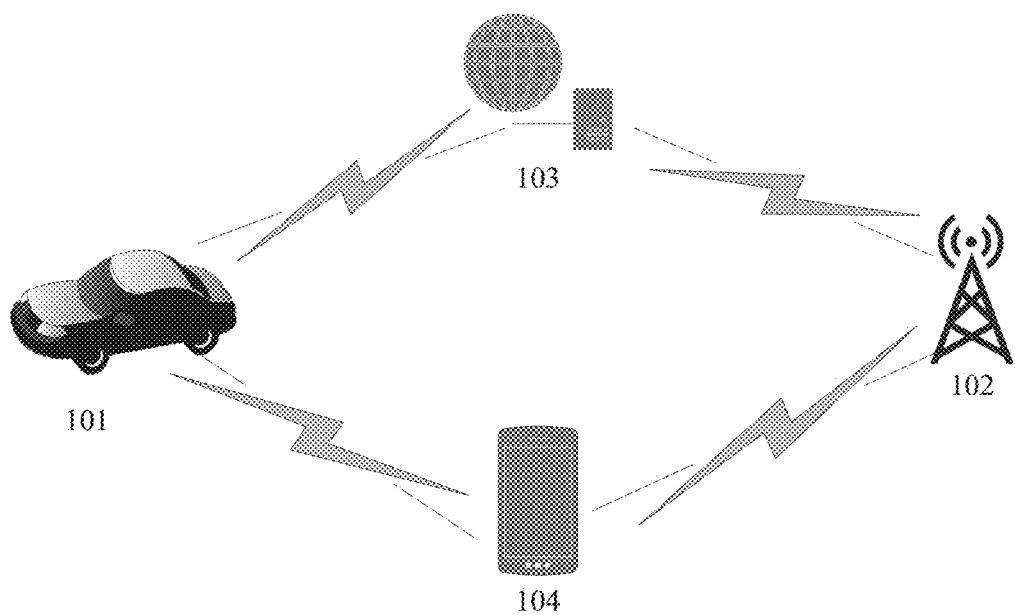
FIG. 1B is a schematic diagram of another Internet of vehicles scenario according to an embodiment of the present invention.

In another internet of vehicles scenario shown in FIG. 1B, a mobile phone 104 may communicate with a TSP server by using a network device (for example, a base station 102). After a user sends a vehicle control command by using an App on the mobile phone 104, the TSP server 103 sends an instruction to the vehicle 101, and the vehicle 101 receives the control command, performs a corresponding operation, and provides an operation result feedback to the APP on the mobile phone 104 of a user. In this hamlet of vehicles scenario, the user may use the mobile phone APP to implement functions remotely, for example, starting the vehicle, turning on an air conditioner, and adjusting a seat.

As a widely used vehicle internal communications protocol, CAN (controller area network, controller area network) is one of the most popular vehicle bus protocols. CAN is mainly used for cooperative work among distributed in-vehicle systems ECUs (electronic control unit, electronic control unit), to implement upper-layer functions. The ECU, also referred to as an in-vehicle computer, is a vehicle-dedicated microcomputer controller that is capable of controlling operation of components such as a vehicle engine by using various sensors. Similar to a general computer, the ECU includes a central processing unit (CPU), a memory (ROM and RAM), an input/output interface (I/O), an analog/digital signal converter (A/D), a driver, and the like.

The TBox may communicate with a vehicle CAN bus to obtain vehicle status information, and upload the vehicle status information to the TSP server. The TBox may further receive an instruction delivered by the TSP server, and return an operation result. Based on this, a remote control function may be extended to a mobile phone APP, a smart vehicle key, and the like. The TBox can perform in-depth reading of vehicle CAN bus data and a proprietary protocol, and send out the data to the server by using a GPRS (general packet radio service, general packet radio service technology) network. The TBox can also provide vehicle condition reporting, driving reporting, fuel consumption statistics, fault alerting, traffic violation query, location tracking, driving behavior, security and anti-theft, a booking service, and remote ride-hailing, and can use a mobile phone to control a door, a window, a light, a lock, a speaker, a double flash, mirror folding, or a sunroof of the vehicle, and monitor central control warnings, a safety air bag status, and the like. The TBox is not only capable of collecting and uploading data, but also capable of serving as an in-vehicle gateway, for example, connecting to a vehicle body network (CAN bus), an in-vehicle network (by using Bluetooth, Wi-Fi, 3G/4G, or the like), or an out-vehicle network (to implement V2V and V2X by using a virtual gateway). The Wi-Fi is short for the wireless fidelity (Wireless Fidelity), 3G is short for the 3rd generation mobile communication technology (3rd generation mobile communication technology), 4G is short for the 4th generation mobile communication technology (4th generation mobile communication technology), V2V is short for vehicle to vehicle (vehicle to vehicle), and V2X is short for vehicle to everything (vehicle to everything).

Figure 1C:
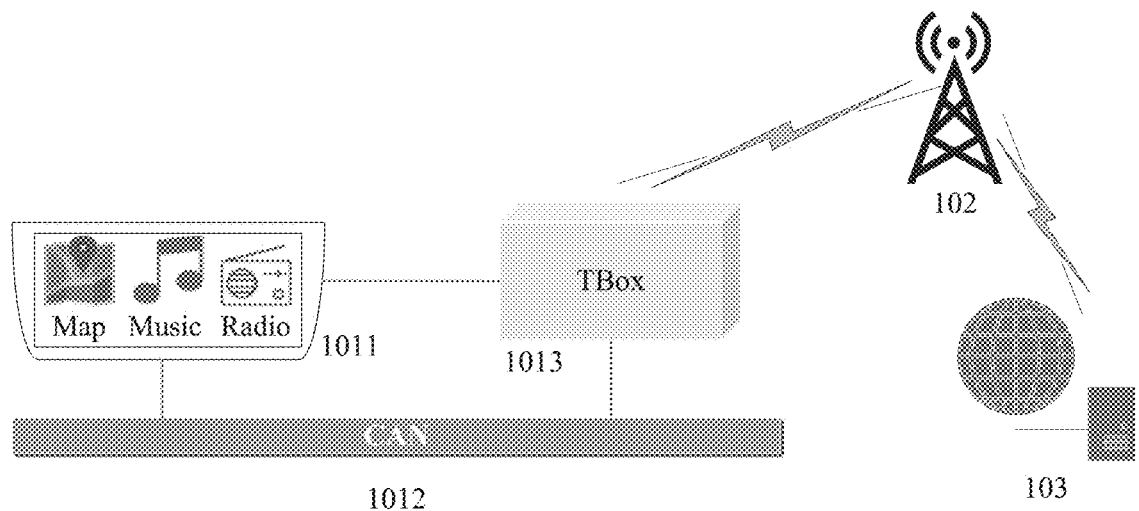
FIG. 1C is a schematic diagram of still another internet of vehicles scenario according to an embodiment of the present invention.

As shown in FIG. 1C, in another internet of vehicles scenario, an in-vehicle infotainment system 1011 may provide functions such as multimedia, web pages, and navigation. A TBox may communicate with a TSP server 103 by using a network device (for example, a base station 102). The in-vehicle infotainment system 1011, a CAN 1012 and a TBox 1013 may implement communication by connecting with each other. For example, the TBox 1013 can read vehicle status information in the CAN 1012.

To implement communication between the TBox and a server and communication between the TBox and a mobile phone APP, a SIM card (subscriber identity module) is usually disposed inside the TBox. Optionally, the SIM card may be similar to a mobile phone SIM card, and may be a SIM card providing a call function and a web-browsing function or an Internet access card without a call function. At present, most vehicles are configured with customized in-vehicle services before delivery from a factory. The SIM card in the TBox generally uses an ESIM (embedded subscriber identity module) card design, and is welded and cannot be replaced. In this circumstance, a user can select only a permanent operator, and user demands for individualized in-vehicle services cannot be met.

An embodiment of the present invention provides an apparatus for in-vehicle service switching, where a TBox provides a slot for insertion of an external SIM card while retaining an existing ESIM card design. For a distinguishing purpose, a SIM card inside the TBox is referred to as an internal SIM card, and a SIM card inserted from outside is referred to as an external SIM card. A SIM card currently used by the TBox is referred to as a primary SIM card, that is, the TBox is connected to a network by using the primary SIM card. A SIM card currently not used by the TBox is referred to as a secondary SIM card, that is, the TBox is connected to the network not by using the secondary SIM card. The TBox can identify whether an inserted external SIM card is a valid. SIM card. Optionally, the foregoing slot supports card presence signal detection, to determine whether a new SIM card is inserted. The TBox determines whether the SIM card is valid by interacting with an interactive serial port of the SIM card based on a standard protocol (the ISO7816 protocol).

Figure 2:
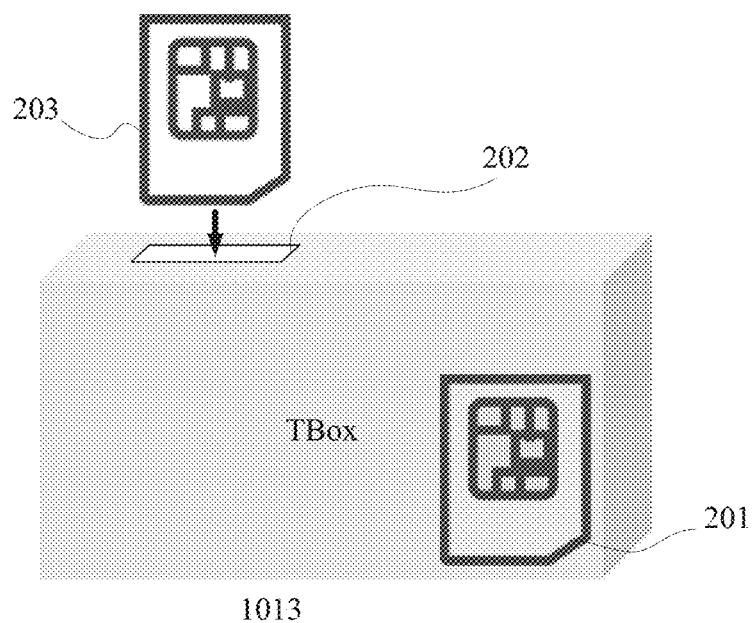
FIG. 2 is a schematic structural diagram of a TBox according to an embodiment of the present invention.

As shown in FIG. 2, a TBox 1013 is provided with an internal SIM card 201 and an external SIM card slot 202, and an external SIM card 203 may be inserted into the external SIM card slot 202. Optionally, the external SIM card slot 202 supports card presence signal detection, and when the external SIM card 203 is inserted into the external SIM card slot 202, detects whether the external SIM card 203 is a valid SIM card. Optionally, the external SIM card is hot swappable. Optionally, the external SIM card slot 202 may be exposed on a control panel of a central control console, so that a user can conveniently insert the external SIM card.

In a possible implementation, when the TBox detects that the external SIM card is a valid SIM card, the TBox sets the external SIM card as a primary SIM card. That is, the TBox switches to a network to which the external SIM card belongs, to log in to a server corresponding to the external SIM card. When no external SIM card is inserted or an inserted SIM card is not a valid SIM card, the TBox is connected to a network to which the internal SIM card belongs to, to log in to a server corresponding to the internal SIM card. Optionally, in a process in which the TBox switches to the network to which the external SIM card belongs, the TBox changes a current in-vehicle service parameter, so as to log in to the server corresponding to the external SIM card. The in-vehicle service parameter may include a server address, a port number, an emergency telephone number, a customer service number, an interactive protocol type, or the like. Optionally, in a process in which the TBox performs primary SIM card switching, the TBox may give a user a message of prompting primary SIM card switching, including a message that primary SIM card switching is about to be performed and a message that primary SIM card switching is successful. The message may be presented in a form of a text, a picture, audio, a video, or the like. This is not limited herein.

In another possible implementation, if the TBox detects that the external SIM card is a valid SIM card, the TBox may prompt the user that there are two SIM cards available. Further, the TBox may prompt the user to make a selection, to select one SIM card from the two SIM cards available as a primary SIM card. The prompting the user to make a selection may be presenting options on a user interface of an in-vehicle infotainment system, or may be presenting options on the mobile phone APP. A form of presentation may be a text, a picture, audio, a video, or the like. This is not limited herein. There may be a plurality of manners for the user to select a primary SIM card, for example, by tapping a touch panel, by pressing a physical or virtual switch, or by giving a voice command. This is not limited herein. After receiving a user selection, the TBox changes the primary SIM card to the SIM card selected by the user. That is, the TBox switches to a network to which the external SIM card belongs, to log in to a server corresponding to the external SIM card. Optionally, in a process in which the TBox performs primary SIM card switching, the TBox may give the user a message of prompting primary SIM card switching, including a message that primary SIM card switching is about to be performed and a message that primary SIM card switching is successful. The message may be presented in a form of a text, a picture, audio, a video, or the like. This is not limited herein.

In still another possible implementation, if the TBox detects that the external SIM card is a valid SIM card, the TBox may automatically select one SIM card from the internal SIM card and the external SIM card as a primary SIM card. Specifically, a rule of automatic selection may be preset by the user, or may be a factory setting of the TBox or a setting updated through the internet. For example, the rule of automatic selection may: preferentially select a specified SIM card in a specified time period, or preferentially select a specified. SIM card in a specified geographic region, or preferentially select a specified SIM card when a specified in-vehicle service is active.

When the user performs primary SIM card switching, the TBox switches to a new primary SIM card to build a network connection. Optionally, in a process in which the TBox switches to the network to which the new SIM card belongs, the TBox changes a current in-vehicle service parameter, so as to log in to the server corresponding to the new primary SIM card. The in-vehicle service parameter may include a server address, a port number, an emergency telephone number, a customer service number, an interactive protocol type, or the like. It can be understood that there are a plurality of manners for the user to perform primary SIM card switching, for example, by tapping a touch panel, by pressing a physical or virtual switch, or by giving a voice command. This is not limited herein. The primary SIM card switching may be implemented by presenting switching options on a user interface of an in-vehicle infotainment system, or by presenting switching options on the mobile phone APP. It should be noted that the user may switch to the internal SIM card by removing the external SIM card. That is, when the user removes the external SIM card, the internal SIM card changes to a primary SIM card, and the TBox builds a network connection by using the internal SIM card. Optionally, in a process in which the TBox performs primary SIM card switching, the TBox may give the user a message of prompting primary SIM card switching, including a message that primary SIM card switching is about to be performed and a message that primary SIM card switching is successful. The message may be presented in a form of a text, a picture, audio, a video, or the like. This is not limited herein.

In the foregoing process of primary SIM card switching, the TBox changes a current in-vehicle service parameter, so as to log in to the server corresponding to the external SIM card. The in-vehicle service parameter may include a server address, a port number, an emergency telephone number, a customer service number, an interactive protocol type, or the like. The user may configure the TBox by using a user interface of the in-vehicle infotainment system or the mobile phone APP. Specifically, a TBox configuration command of the user is sent to the server, the server transmits the configuration command to an ECU by using the primary SIM card, and after parsing the configuration command, the ECU performs corresponding configuration. Optionally, the TBox may provide an API (Application Programming Interface, application programming interface) for the corresponding configuration command, so that a third-party server may call the corresponding configuration command.

After logging in to the server corresponding to the primary SIM card, the TBox obtains content of an in-vehicle service in the server. Optionally, the content of the in-vehicle service is mapped to the in-vehicle infotainment system in a form of an STK (SIM tool kit) menu. The STK may be used for customizing software in the SIM card. For example, an operator can customize a value-added service in the SIM card by using the STK. Similarly, in an internet of vehicles system, a TSP may customize an in-vehicle service in the SIM card by using the STK, and map the service to the in-vehicle infotainment system in a form of an STK (SIM tool kit) menu, so that the user may select a corresponding in-vehicle service. In a process in which the TBox performs primary SIM card switching, the in-vehicle infotainment system changes a user interface to an STK menu corresponding to a new primary SIM card, so as to display an in-vehicle service provided by the new primary SIM card for the user to select.

Figure 3:
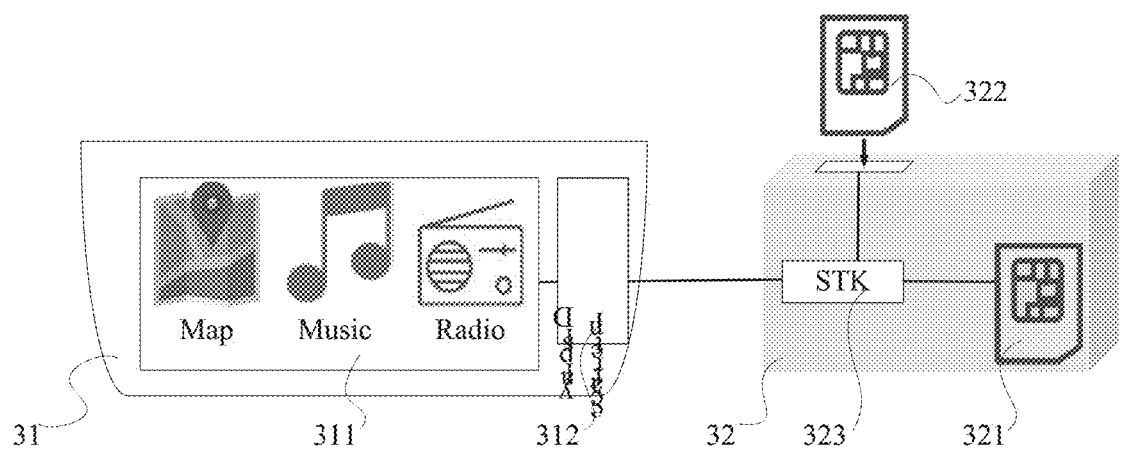
FIG. 3 is a schematic structural diagram of a connection between an in-vehicle infotainment system and a TBox according to an embodiment of the present invention.

As shown in FIG. 3, in a possible implementation, an in-vehicle infotainment system 31 includes a user interface 311 and a display interface 312. The user interface 311 is configured to present an in-vehicle service menu for user selection. The display interface 312 is configured to connect to a TBox 32. The display interface 312 may be connected to the TBox 32 in various manners. For example, the display interface 312 may be a USB (Universal Serial Bus, Universal Serial Bus) interface, including USB2.0, USB3.0, Micro USB, and the like. Alternatively, the display interface 312 may be connected to the TBox 32 by using an Ethernet. For example, the display interface 312 may be an Ethernet interface connected to the TBox 32 by using an optical fiber, a coaxial cable, or the like. Certainly, the in-vehicle infotainment system 31 may alternatively be connected to the TBox 32 in a wireless manner such as Wi-Fi (Wireless Fidelity, Wireless Fidelity) or Bluetooth. This is not limited herein. The TBox 32 includes an internal SIM card 321, an external SIM card 322 and an STK 323. It can be understood that the TBox 32 further includes SIM card slots corresponding to the internal SIM card 321 and the external SIM card 322. The internal SIM card 321 and the external SIM card 322 are connected to the STK 323, and are mapped to the user interface 311 of the in-vehicle infotainment system 31 by using the STK 323. It can be understood that the TBox 32 may not include the STK 323, or, the TBox 32 may include the STK 323, but the STK 323 is connected to only one of the internal SIM card 321 and the external SIM card 322.

Figure 4:
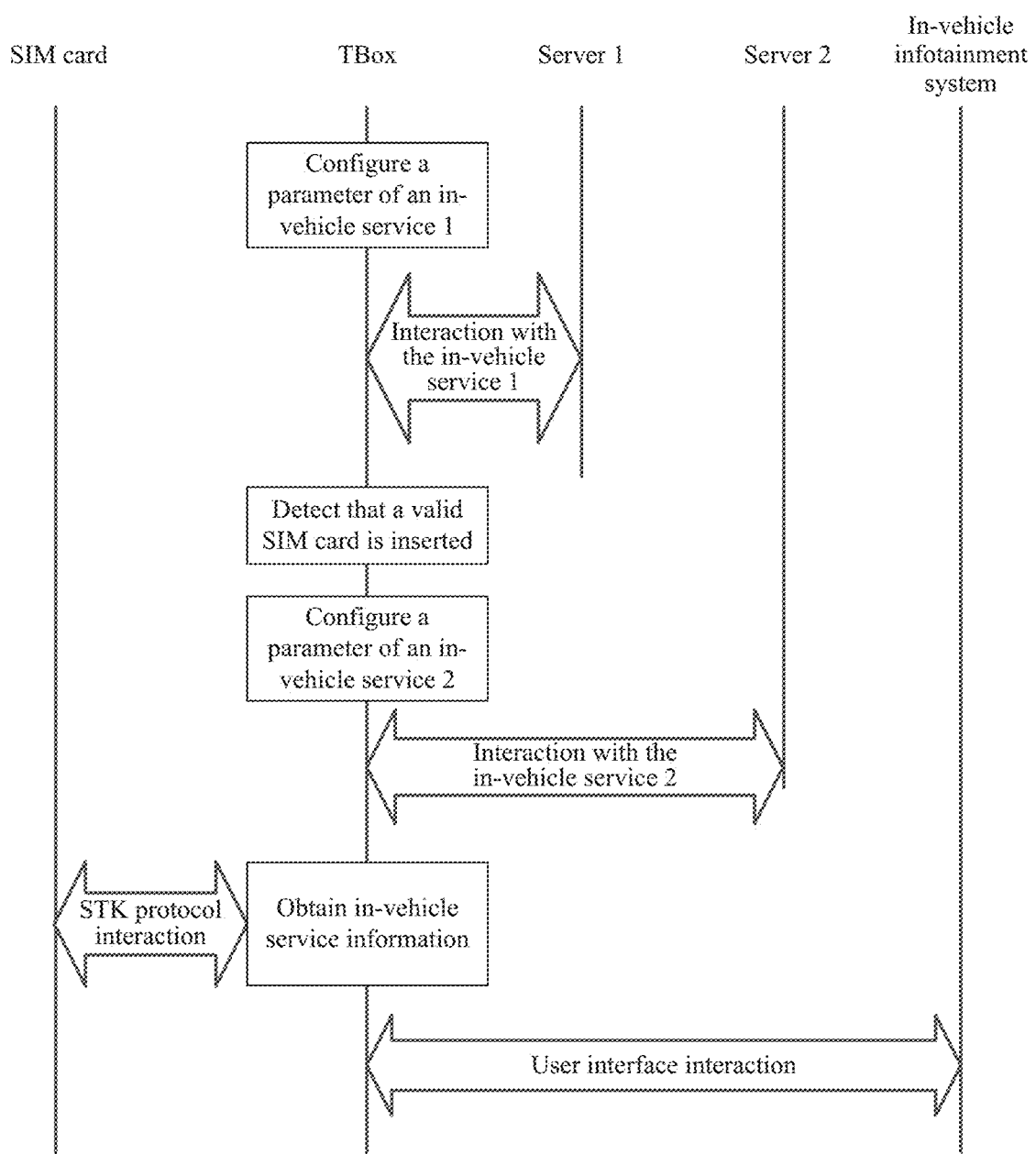
FIG. 4 is a flowchart of in-vehicle service switching according to an embodiment of the present invention.

FIG. 4 shows a possible interaction flowchart of in-vehicle service switching. A TBox is provided with an internal SIM card and an external SIM card slot. An in-vehicle infotainment system is configured to display a user interface of an in-vehicle service menu. The TBox may interact with a SIM card based on an STK protocol to obtain in-vehicle service information. When the TBox detects that an external SIM card is a valid SIM card, the TBox sets the external SIM card as a primary SIM card. That is, the TBox switches to a network to which the external SIM card belongs, to log in to a server corresponding to the external SIM card. A TSP server corresponding to the internal SIM card is referred to as a server 1, and the server 1 provides an in-vehicle service 1; a TSP server corresponding to the external SIM card is referred to as a server 2, and the server 2 provides an in-vehicle service 2. When the external SIM card is not inserted or the external SIM card is not a valid SIM card, the TBox logs in to the server 1 to interact with the in-vehicle service 1, and the interaction is displayed on the user interface of the in-vehicle infotainment system. When the TBox detects that a valid SIM card is inserted, the TBox changes an in-vehicle service parameter, and logs in to the server 2 to interact with the in-vehicle service 2, and the interaction is displayed on the user interface of the in-vehicle infotainment system.

The foregoing TBox is provided with an internal SIM card that cannot be replaced and an external SIM card slot. Based on the foregoing implementations, a person skilled in the art may figure out the following solutions:

1. The internal SIM card of the TBox is changed to a replaceable design, to facilitate convenience of insertion and removal of the SIM card by a user. In other words, the user can replace the SIM card in an internal SIM card slot. Alternatively, the internal SIM card may be removed and only the external SIM card slot is retained. Optionally, the TBox may be provided with a plurality of external SIM card slots. When a plurality of valid SIM cards are inserted, the user may select a primary SIM card, or the TBox performs primary SIM card switching based on a preset priority order. The preset priority order may be preset by the user, or may be a factory setting of the TBox, or may be a setting updated through the internet.

2. The TBox may be provided with one internal SIM card and a plurality of external SIM card slots. Optionally, the internal SIM card may be irreplaceable or may be replaceable. Similarly, when a plurality of valid SIM cards are inserted, the user may select a primary SIM card, or the TBox performs primary SIM card switching based on a preset priority order.

3. The internal SIM card of the TBox is a soft SIM card (soft SIM) or a virtual SIM card. The soft SIM card or the virtual SIM card may allow the user to conveniently change a network and a tariff package of an operator, and make the TBox a lightener and thinner device.

4. The TBox may be provided with one internal SIM card slot supporting dual card dual standby, allowing the user to switch between operators and tariff packages of two SIM cards, so as to obtain broader signal coverage. Alternatively, the TBox may be provided with one external SIM card slot supporting dual card dual standby.

It can be understood that these solutions and any replacements, combinations, and variations thereof all fall within the protection scope of this application.

Figure 5:
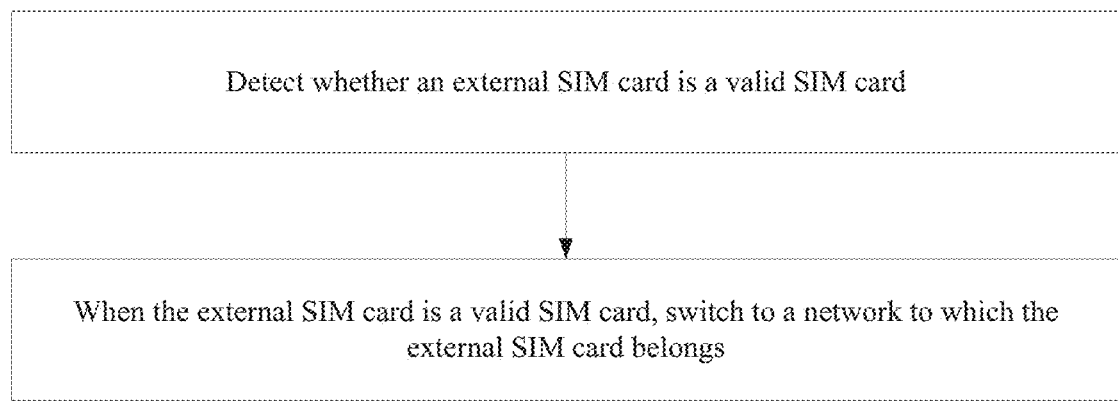
FIG. 5 is a method for switching an in-vehicle service by using an external SIM card according to an embodiment of the present invention.

As shown in FIG. 5, another embodiment of the present invention further provides a method for switching an in-vehicle service by using an external SENT card. The method includes the following steps.

S501: A TBox detects whether an external SIM card is a valid SIM card.

The TBox is provided with an external SIM card slot, and the slot supports card presence signal detection, to determine whether a new SIM card is inserted to the external SIM card slot. The TBox determines whether the SIM card is valid by interacting with an interactive serial port of the SIM card based on a standard protocol (the ISO7816 protocol).

S502: When the external SIM card is a valid SIM card, the TBox switches to a network to which the external SIM card belongs.

That the TBox switches to a network to which the external SIM card belongs may include: changing, by the TBox, an in-vehicle service parameter, logging in to a server corresponding to the external SIM card, and displaying an in-vehicle service of the external SIM card on a user interface of an in-vehicle infotainment system in a form of an STK menu.

If no SIM card is inserted into the external SIM card slot or an inserted external SIM card is not a valid SIM card, a connection to a network to which the internal SIM card belongs is retained.

In addition, still another embodiment of the present invention further provides an apparatus, including one or more processors, a memory, and one or more programs. The one or more programs are stored in the memory and configured for execution by one or more processors, and the one or more programs include an instruction. The instruction is used to detect whether a valid SIM card is inserted into an external SIM card slot of a TBox, and when the TBox detects that a valid external SIM card is inserted into the external SIM card slot, the TBox switches to a network to which the external SIM card belongs.

Figure 6:
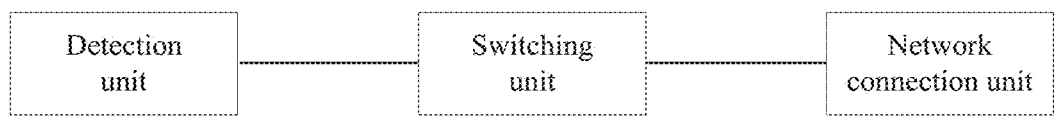
FIG. 6 is an apparatus for switching an in-vehicle service by using an external SIM card.

Moreover, referring to FIG. 6, still another embodiment of the present invention further provides an apparatus for switching an in-vehicle service by using an external SIM card. The apparatus includes a detection unit, a switching unit, and a network connection unit. The detection unit is configured to detect whether a valid SIM card is inserted into an external SIM card slot of a TBox; the switching unit is configured to: when the detection unit detects that a valid SIM card is inserted into the external SIM card slot of the TBox, switch to a network to which the external SIM card belongs; and the network connection unit is configured to connect to the corresponding network based on a switching result of the switching unit.

In addition, another embodiment of the present invention further provides a storage medium for storing a computer software instruction. The instruction is used to detect whether a valid SIM card is inserted into an external SIM card slot of a TBox, and when the TBox detects that a valid external SIM card is inserted into the external SIM card slot, the TBox switches to a network to which the external SIM card belongs.

A person of ordinary skill in the art should understand that units, rules, and method steps of examples described with reference to the embodiments disclosed in this specification may be implemented by a combination of computer software and electronic hardware. Whether these functions are performed by hardware or software depends on particular applications and design constraints of the technical solutions. A person skilled in the art may use a different method to implement the described functions for each particular application, but it should not be considered that the implementation goes beyond the scope of the present invent ion.

It should be understood that, the term "and/or" used in this specification indicates and includes any or all of possible combinations of one or more items in associatively listed items. It should also be understood that use of the term "include" and/or "comprise" in this specification indicates presence of a stated feature, integer, step, operation, element, and/or component, but does not exclude presence or addition of one or more other features, integers, steps, operations, elements, components, and/or their combinations.

The terms used in the description of the present invention in this specification are merely for the purpose of describing specific embodiments, and are not intended to limit the present invention. The terms "one", "a" and "this" of singular forms used in this specification and the appended claims of the present invention are also intended to include plural forms, unless otherwise specified in the context explicitly.

The units described as separate parts may or may not be physically separate. Parts displayed as units may or may not be physical units, and may be located in one position or distributed on a plurality of network units. Some or all of the units may be selected based on actual needs to achieve the objectives of the solutions of the embodiments of the present invention. Functional units in the embodiments of the present invention may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for switching an in-vehicle service by using an external SIM card, wherein the apparatus is a TBox provided with an external SIM card slot, and when the TBox detects that a valid external SIM card is inserted into the external SIM card slot, the TBox switches to a network to which the external SIM card belongs, wherein:
    there are a plurality of external SIM card slots, when the TBox detects that a plurality of valid external SIM cards are inserted into the plurality of external SIM card slots, the TBox switches to a network to which an external SIM card belongs based on a user selection or a preset priority order, wherein the preset priority order is at least based on following condition: time, geographic region, or when performing a specified in-vehicle service; and
    the TBox is configured to give a plurality of user messages of prompting SIM card switching on a user interface, wherein the plurality of user messages comprises:
        a first message indicating that SIM card switching is about to be performed; and
        a second message indicating that the SIM card switching is successful; and
    wherein the TBox switching to the network to which the external SIM card belongs further comprises: changing, by the TBox, an in-vehicle service parameter, logging in to a server corresponding to the external SIM card, and obtaining content of an in-vehicle service.

2. The apparatus according to claim 1, wherein the external SIM card slot supports card presence signal detection.

3. The apparatus according to claim 1, wherein the changing an in-vehicle service parameter comprises changing at least one of the following parameters: a server address, a port number, an emergency telephone number, a customer service number, and an interactive protocol type.

4. The apparatus according to claim 3, wherein the content of the in-vehicle service is mapped to an in-vehicle infotainment system in a form of an STK (SIM tool kit) menu.

5. The apparatus according to claim 1, wherein the external SIM card slot supports insertion of a soft SIM card or a virtual SIM card.

6. The apparatus according to claim 1, wherein the first message and the second message are presented in form of a text, a picture, an audio, a video, or their combination thereof.

7. The apparatus according to claim 1, wherein the user selection is performed by tapping a touch panel, by pressing a physical switch or a virtual switch, or by giving a voice command.

8. A method for switching an in-vehicle service by using an external SIM card, comprising:
    detecting whether a valid SIM card is inserted into an external SIM card slot of a TBox; and
    when the TBox detects that a valid external SIM card is inserted into the external SIM card slot, switching, by the TBox, to a network to which the external SIM card belongs, wherein:
        there are a plurality of external SIM card slots, when the TBox detects that a plurality of valid external SIM cards are inserted into the plurality of external SIM card slots, the TBox switches to a network to which an external SIM card belongs based on a user selection or a preset priority order, wherein the preset priority order is at least based on following condition: time, geographic region, or when performing a specified in-vehicle service; and
        the TBox is configured to give a plurality of user messages of prompting SIM card switching on a user interface, wherein the plurality of user messages comprises:
            a first message indicating that SIM card switching is about to be performed; and
            a second message indicating that the SIM card switching is successful; and wherein the TBox switching to the network to which the external SIM card belongs further comprises: changing, by the TBox, an in-vehicle service parameter, logging in to a server corresponding to the external SIM card, and obtaining content of an in-vehicle service.

9. A non-transitory computer storage medium storing one or more programs, wherein the one or more programs comprise an instruction, wherein the instruction is used to detect whether a valid SIM card is inserted into an external SIM card slot of a TBox, and when the TBox detects that a valid external SIM card is inserted into the external SIM card slot, the TBox switches to a network to which the external SIM card belongs, wherein:
    there are a plurality of external SIM card slots, when the TBox detects that a plurality of valid external SIM cards are inserted into the plurality of external SIM card slots, the TBox switches to a network to which an external SIM card belongs based on a user selection or a preset priority order, the preset priority order is at least based on following condition: time, geographic region, or when performing a specified in-vehicle service; and
    the TBox is configured to give a plurality of user messages of prompting SIM card switching on a user interface, wherein the plurality of user messages comprises:
        a first message indicating that SIM card switching is about to be performed; and
        a second message indicating that the SIM card switching is successful; and, wherein the TBox switching to the network to which the external SIM card belongs further comprises: changing, by the TBox, an in-vehicle service parameter, logging in to a server corresponding to the external SIM card, and obtaining content of an in-vehicle service.

* * * * *